(12) United States Patent
Burton

(10) Patent No.: US 10,266,107 B2
(45) Date of Patent: Apr. 23, 2019

(54) CLUTCH FORCE ADJUSTER MECHANISM

(71) Applicant: Burton Technologies, LLC, Ludington, MI (US)

(72) Inventor: John E. Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 0 days.

(21) Appl. No.: 15/844,920

(22) Filed: Dec. 18, 2017

(65) Prior Publication Data

US 2018/0170246 A1 Jun. 21, 2018

Related U.S. Application Data

(60) Provisional application No. 62/437,371, filed on Dec. 21, 2016.

(51) Int. Cl.
*F21V 19/02* (2006.01)
*B60Q 1/26* (2006.01)
*B60Q 1/04* (2006.01)
*B60Q 1/068* (2006.01)
*F16H 25/20* (2006.01)

(52) U.S. Cl.
CPC .......... *B60Q 1/2642* (2013.01); *B60Q 1/0408* (2013.01); *B60Q 1/0683* (2013.01); *F16H 25/2021* (2013.01)

(58) Field of Classification Search
CPC .. B60Q 1/0408; B60Q 1/0683; B60Q 1/2642; F16H 25/2021
USPC ........................................................ 362/523
See application file for complete search history.

(56) References Cited

U.S. PATENT DOCUMENTS

| 5,707,133 | A | 1/1998 | Burton |
|---|---|---|---|
| 6,017,136 | A | 1/2000 | Burton |
| 6,257,747 | B1 | 7/2001 | Burton |

(Continued)

FOREIGN PATENT DOCUMENTS

| CN | 103378707 | 10/2013 |
|---|---|---|
| CN | 104913271 | 9/2015 |

(Continued)

OTHER PUBLICATIONS

Search Report dated Apr. 6, 2018 for European Patent Application 17208904.7-1012.

(Continued)

*Primary Examiner* — Thien M Le
(74) *Attorney, Agent, or Firm* — James Joyce; Godfrey & Kahn, S.C.

(57) ABSTRACT

An adjuster mechanism that includes an adjustment gear, a housing with a radial lip, and a ball stud having stud teeth and a threaded portion threadingly engaged with the lip to retract and extend the ball stud relative to the lip during rotation of the ball stud. The gear having a gear body situated at least partially inside the housing and having splines for engaging the stud teeth to rotate the ball stud during rotation of the gear. Recessed inward relative to a gear body outer surface is a clutch tab that extends from a recessed side wall to form a side hinge. A stop wall on the clutch tab is engageable with the stud teeth when rotating the gear body in a first direction or second direction and disengageable from the stud teeth when rotating the gear body in the other of the first direction or second direction.

20 Claims, 14 Drawing Sheets

(56) References Cited

U.S. PATENT DOCUMENTS

| | | |
|---|---|---|
| 6,447,154 B1 | 9/2002 | Denley |
| 6,773,153 B2 | 8/2004 | Burton |
| 6,974,231 B2 | 12/2005 | Burton |
| 8,240,528 B2 * | 8/2012 | Barnes .................. B62J 11/00 224/419 |
| 2001/0030875 A1 | 10/2001 | Benley |
| 2003/0043591 A1 * | 3/2003 | Burton ................ B60Q 1/0683 362/528 |
| 2005/0002201 A1 * | 1/2005 | Burton ................ B60Q 1/0683 362/529 |
| 2007/0041206 A1 * | 2/2007 | Aguinaga .............. B60Q 1/068 362/524 |
| 2008/0175014 A1 * | 7/2008 | Fladhammer ........ B60Q 1/0683 362/514 |
| 2010/0186528 A1 | 7/2010 | Hillen et al. |
| 2010/0213310 A1 | 8/2010 | Flatt et al. |
| 2014/0029278 A1 * | 1/2014 | Burton .................. B60Q 1/068 362/487 |
| 2015/0117042 A1 * | 4/2015 | Burton ................ B60Q 1/0683 362/487 |
| 2015/0197179 A1 * | 7/2015 | King ...................... F16H 35/10 362/460 |
| 2016/0159271 A1 * | 6/2016 | Helwig .................. B60Q 1/08 362/463 |

FOREIGN PATENT DOCUMENTS

| | | |
|---|---|---|
| DE | 10332976 | 4/2005 |
| EP | 2918447 | 3/2015 |

OTHER PUBLICATIONS

Chinese Search Report dated Jan. 24, 2019 for corresponding Chinese Application No. 201711393775.X.

* cited by examiner

CLUTCH FORCE ADJUSTER MECHANISM

CROSS-REFERENCE TO RELATED APPLICATION

This application claims priority to U.S. Provisional Patent Appl. No. 62/437,371 filed on Dec. 21, 2016, the disclosure of which is incorporated herein by reference in entirety for all purposes.

FIELD OF THE INVENTION

The invention relates generally to the field of adjusters that are used to adjust the aim of a vehicle lamp. More particularly, the invention relates to a clutch force adjuster mechanism for a vehicle lamp.

BACKGROUND

Vehicles such as automobiles typically have several lamps including head lamps and fog lamps. These lamps generally include a housing supporting a reflector (which is typically mounted within the housing on a mounting bracket) and a lens with a bulb mounted therebetween, the entire lamp assembly being attached to the vehicle. Examples of such a configuration are shown in U.S. Pat. Nos. 5,707,133 and 6,974,231 to Burton. Once the lamp assembly has been manufactured and installed into a vehicle, the lamp must be adjusted to the proper aim. Typically the adjustment is in both the vertical and horizontal directions although, depending on the type of lamp and applicable regulations, adjustment in only one direction may be required. As a result of accidents, maintenance, and normal vibrations and wear, the aim of the lamp may need to be occasionally adjusted during the lifetime of the vehicle as well.

One method of adjusting the aim of the lamp involves using an adjuster. The adjuster can be formed as part of the mounting bracket, part of the housing, or can be a separate part between the housing and the mounting bracket (or the reflector directly if no separate mounting bracket is used). One known type of adjuster includes a housing and an output shaft extending therefrom. The output shaft is engaged to the reflector directly or to a mounting bracket on which the reflector is positioned. Actuation or operation of the adjuster causes the output shaft to move. Such movement causes the mounting bracket and/or reflector to pivot or otherwise move with respect to the housing, thereby adjusting the aim of the lamp. One example of this type of adjuster is disclosed in U.S. Pat. No. 6,773,153 to Burton, the disclosure of which is incorporated herein by reference for all purposes. The housing of the adjuster in this Burton design has an opening and a gear positioned inside the housing. The gear is functionally engaged to a ball stud. An input shaft is positioned in the opening and interacts with the gear. Actuation of the input shaft results in rotation of the gear and engaged ball stud. The gear translates actuation of the input shaft into axial movement of the ball stud and its ball stud end. Numerous variations exist on this general concept.

Having end-of-travel clutching regardless of a resistance force present is desirable to both achieve a minimum required amount of travel for aiming while also preventing damage to adjuster function, disengagement or damage to the headlamp components, the reflector and mounting bracket in particular. One method for accomplishing end of travel clutching is disclosed in U.S. Pat. No. 6,773,153 to Burton. Some headlamps have a high resistance force to overcome during aiming. A common cause for this is resistance from rubber reflector seals. Thus, it is desirable to have an adjuster that includes end of travel clutching regardless of resistance present. It is also desirable to assure aiming function under resistance from headlamp components that may increase the torque required for adjustment, especially at the end of travel. In particular, after clutching has occurred at the end of travel, it is important to be able to re-engage the ball stud in the return direction without failure of the clutching features due to an increased adjustment torque. Preventing failure of the clutching features during re-engagement avoids a 'stuck' (i.e., inoperable) adjuster that is unable to aim. Having a high failure torque resistance of the clutching features in this direction is desirable and is generally referred to as "re-engagement torque." Clutching torque on the other hand is the torque generated as the gear rotates while disengaging from the ball stud being held fixed. Clutching torque needs to be limited and kept low enough in order to prevent failure of the thread stop holding torque or another means of holding the ball stud fixed at the end of travel, such as, but not limited to, thread interference between the ball stud and housing.

Accordingly, a need exists for an improved adjuster that solves these and other deficiencies in the prior art. It will be understood by those skilled in the art that one or more aspects of this clutching mechanism can meet certain objectives, while one or more other aspects can lead to certain other objectives. Other features, benefits and advantages of the clutch force adjuster mechanism will be apparent in this summary and descriptions of the disclosed embodiment, and will be readily apparent to those skilled in the art. Such features, benefits and advantages will be apparent from the above as taken in conjunction with the accompanying figures and all reasonable inferences to be drawn therefrom.

SUMMARY OF THE INVENTION

While one possible application of the clutch force adjuster mechanism is in connection with a vehicle lamp, other applications are possible and references to use in connection with a vehicle lamp, lamp assembly, etc., should not be deemed to limit the uses of the clutch force adjuster mechanism. The terms used herein should not be interpreted as being limited to specific forms, shapes, or compositions. Rather, the parts can have a wide variety of shapes and forms and can be composed of a wide variety of materials. These and other features of the clutch force adjuster mechanism will become apparent from the detailed description, claims, and accompanying drawings.

In at least some embodiments, an exemplary adjuster mechanism is provided that includes: an adjuster housing having a barrel extending from a front surface with a barrel cavity and a radial housing lip, wherein the radial housing lip includes at least one of an inbound lip stop and an outbound lip stop; an adjustment gear situated at least partially inside the adjuster housing, the adjustment gear having a cylindrical gear body and a plurality of gear teeth encircling the gear body; a substantially cylindrical ball stud having a ball stud main body portion with a plurality of stud teeth encircling the ball stud main body portion in a spaced relation, wherein the ball stud includes a threaded portion threadingly engaged with the radial housing lip to retract and extend the ball stud relative to the radial housing lip during rotation of the ball stud; a plurality of outbound clutch tabs extending inwardly from an angled recessed outbound side wall on the gear body, wherein the outbound clutch tabs further include a recessed outbound bottom wall, an outbound top wall situated adjacent a gear front wall of the gear, and an outbound stop wall situated opposite the outbound side wall and substantially between the outbound top wall and the outbound bottom wall; a plurality of inbound clutch tabs extending inwardly from an angled recessed inbound side wall on the gear body, wherein the inbound clutch tabs further include a recessed inbound bottom wall, an inbound top wall situated adjacent a gear rear wall of the gear, and an inbound stop wall situated opposite the inbound side wall and substantially between the inbound top wall and the inbound bottom wall; a plurality of splines extending longitudinally along the gear inner surface, configured to matingly engage and rotate the plurality of gear teeth to retract and extend the ball stud; an inbound ball stud stop and an outbound ball stud stop positioned at either ends of the threaded portion for engagement with the at least one of inbound lip stop and outbound lip stop during retraction or extension of the ball stud; wherein upon engagement of the inbound ball stud stop with the inbound lip stop via a first rotational direction of the gear and ball stud during retraction of the ball stud, the inbound stop walls slide over the stud teeth to prevent continued rotation of the ball stud in the first direction while allowing continued rotation of the gear, and wherein rotation of the gear is reversed to a second direction, the inbound stop walls engage the stud teeth to rotate the ball stud in the second direction to extend the ball stud; and wherein upon engagement of the outbound ball stud stop with the outbound lip stop via rotation of the gear and ball stud in the second direction during extension of the ball stud, the outbound stop walls slide over the stud teeth to prevent continued rotation of the ball stud in the second direction while allowing continued rotation of the gear, and wherein rotation of the gear is reversed to the first direction, the outbound stop walls engage the stud teeth to rotate the ball stud in the first direction to retract the ball stud.

In at least some other embodiments, disclosed is an exemplary adjuster mechanism that includes: an adjuster housing having a barrel extending from a housing front portion, the barrel including an inner barrel cavity and a radial housing lip; an adjustment gear situated at least partially inside the adjuster housing, the adjustment gear having a cylindrical gear body, a gear rear wall, a gear front wall, and a plurality of gear teeth; a substantially cylindrical ball stud positioned at least partially within the barrel, and that includes a ball stud main body portion having a plurality of stud teeth encircling the ball stud main body portion at a ball stud first end, and a threaded portion longitudinally extending from the main body portion and being threadingly engaged with the radial housing lip to retract and extend the ball stud relative to the radial housing lip during rotation of the ball stud; a plurality of splines extending longitudinally along an inner surface of the adjustment gear, configured to engage the plurality of stud teeth to provide rotation of the ball stud via rotation of the adjustment gear; and a clutch tab formed in at least one end of the gear body, wherein the clutch tab is recessed inward relative to a gear body outer surface and extends from a recessed side wall to form a side hinge, wherein the clutch tab includes a longitudinal stop wall situated on a bent portion of the clutch tab, and the side hinge is angled relative to the stop wall, and wherein the bent portion is angled inward and away from the gear body outer surface such that the stop wall is engageable with the stud teeth when rotating the gear body in a first direction or second direction and disengageable from the stud teeth when rotating the gear body in the other of the first direction or second direction.

In at least another embodiment, disclosed is an exemplary adjuster mechanism that includes: an adjuster housing having a barrel extending from a housing front portion, the barrel including an inner barrel cavity and a radial housing lip; an adjustment gear situated at least partially inside the adjuster housing, the adjustment gear having a cylindrical gear body with a gear body outer surface, a gear rear wall, a gear front wall, and a plurality of gear teeth; a substantially cylindrical ball stud positioned at least partially within the barrel and housing, and which includes a ball stud main body portion having a plurality of stud teeth encircling the ball stud main body portion at a ball stud first end, and a threaded portion longitudinally extending from the main body portion and being threadingly engaged with the radial housing lip to retract and extend the ball stud relative to the radial housing lip during rotation of the ball stud; a plurality of splines extending longitudinally along an inner surface of the adjustment gear, configured to engage the plurality of stud teeth to cause rotation of the ball stud via rotation of the adjustment gear; an outbound clutch tab formed about a gear body first end, wherein the outbound clutch tab is recessed inward relative to the gear body outer surface and extends from a recessed outbound bottom wall and a recessed outbound side wall to form an outbound side hinge, wherein the outbound clutch tab further includes a longitudinal outbound stop wall situated on an outbound bent portion of the outbound clutch tab that is angled inward and away from the gear body outer surface, such that the outbound stop wall is engageable with the stud teeth when rotating the gear body in a first direction and disengageable from the stud teeth when rotating the gear body in a second direction opposite the first direction, wherein the outbound side hinge is angled relative to the outbound stop wall; and an inbound clutch tab formed about a gear body second end, wherein the inbound clutch tab is recessed inward relative to the gear body outer surface and extends from a recessed inbound bottom wall and a recessed inbound side wall to form an inbound side hinge, wherein the inbound clutch tab further includes a longitudinal inbound stop wall situated on an inbound bent portion of the inbound clutch tab that is angled inward and away from the gear body outer surface, such that the inbound stop wall is engageable with the stud teeth when rotating the gear body in the second direction and disengageable from the stud teeth when rotating the gear body in the first direction, and wherein the inbound side hinge is angled relative to the inbound stop wall.

In at least yet some other embodiments, disclosed is an exemplary adjustment gear that includes: a gear body with a gear body outer surface, an inner surface, a gear rear wall, a gear front wall, and a plurality of gear teeth; a plurality of protrusions extending longitudinally along the inner surface engageable with a ball stud; an outbound clutch tab formed about a gear body first end, wherein the outbound clutch tab is recessed inward relative to the gear body outer surface and extends at least in part from a recessed outbound side wall to form an outbound side hinge, the outbound clutch tab further includes a longitudinal outbound stop wall situated on an outbound bent portion that is angled inward and away from the gear body outer surface, wherein the outbound stop wall is engageable with one or more portions of the ball stud during a first directional rotation of the gear body and is disengageable with the one or more portions of the ball stud during a second and opposite directional rotation of the gear body, and wherein the outbound hinge is angled relative to the outbound stop wall; and an inbound clutch tab formed about a gear body second end, wherein the inbound clutch tab is recessed inward relative to the gear body outer surface and extends at least in part from a recessed inbound side wall to form an inbound side hinge, wherein the inbound clutch tab further includes a longitudinal inbound stop wall situated on an inbound bent portion that is angled inward and away from the gear body outer surface, wherein the inbound stop wall is disengageable with the one or more portions of the ball stud during the first directional rotation of the gear body and is engageable with the one or more portions of the ball stud during the second directional rotation of the gear body, and wherein the inbound hinge is angled relative to the inbound stop wall.

BRIEF DESCRIPTION OF THE DRAWINGS

Embodiments of the clutch force adjuster mechanism are disclosed with reference to the accompanying drawings and are for illustrative purposes only. The clutch force adjuster mechanism is not limited in application to the details of construction or the arrangement of the components illustrated in the drawings. The clutch force adjuster mechanism is capable of other embodiments or of being practiced or carried out in other various ways. In the drawings.

DETAILED DESCRIPTION

As shown in FIG. 13 of U.S. Pat. No. 6,773,153, incorporated by reference herein, automotive lamp assemblies used as headlights typically comprise several basic parts: a support frame, a headlamp reflector, a lens, a bulb, and one or more adjusters. The support frame houses the headlamp reflector and the bulb on a pivotable mounting to allow the aim of the light to be adjusted using the adjuster. The lens seals the front of the assembly to protect it from the elements assailing the front end of the vehicle. In such a configuration, the headlamp reflector mounts inside the housing on one or more fixed ball joints and can be adjustable horizontally and/or vertically using adjusters that interface with the reflector through moving ball joints. It is noted that FIG. 13 of U.S. Pat. No. 6,773,153 is the only prior art FIG. referenced herein.

Figure 1A:
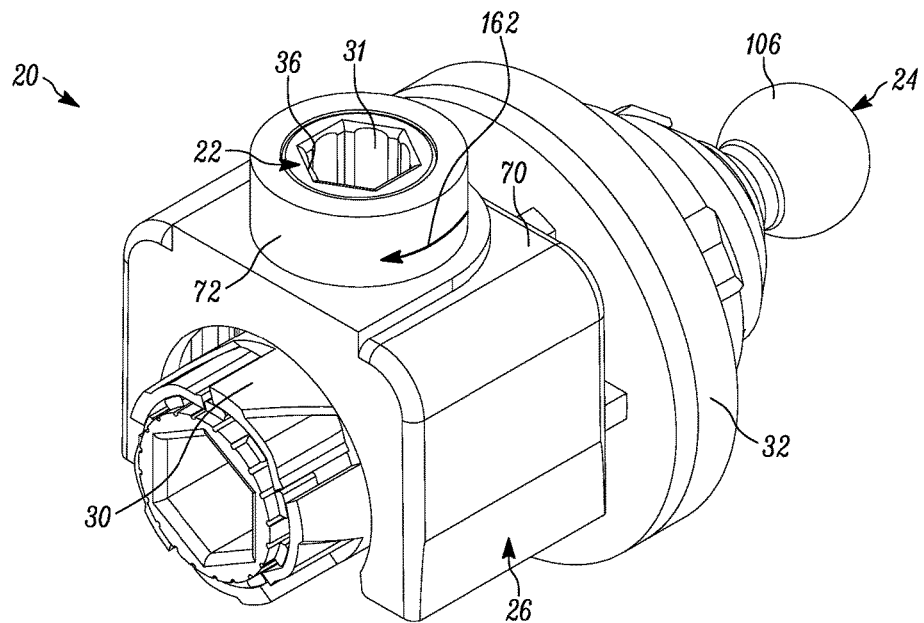
FIG. 1A is a rear perspective view of an exemplary embodiment of the clutch force adjuster mechanism.

FIGS. 1A-1F illustrate an exemplary embodiment of a clutch force adjuster mechanism 20 that includes an input shaft 22 operably connected to a ball stud 24 and a gear 30, each of which are generally positioned by an adjuster housing 26. FIGS. 2A-5C provide a more detailed showing of the housing 26, ball stud 24, and gear 30. Referring to FIG. 1A, the input shaft 22 is the component that is used by an automobile technician or vehicle owner to aim a corresponding headlamp reflector. The input shaft 22 includes an engagement portion 31, which can take the form of a protrusion or a depression, which is sized and shaped to accommodate a tool for applying torque. Shown by way of example, is an exemplary engagement portion 31 in the form of a TORX® shaped depression 36. Secured to the input shaft 22 is a bevel gear (not shown) that engages gear 30, as discussed in detail below.

Figure 2A:
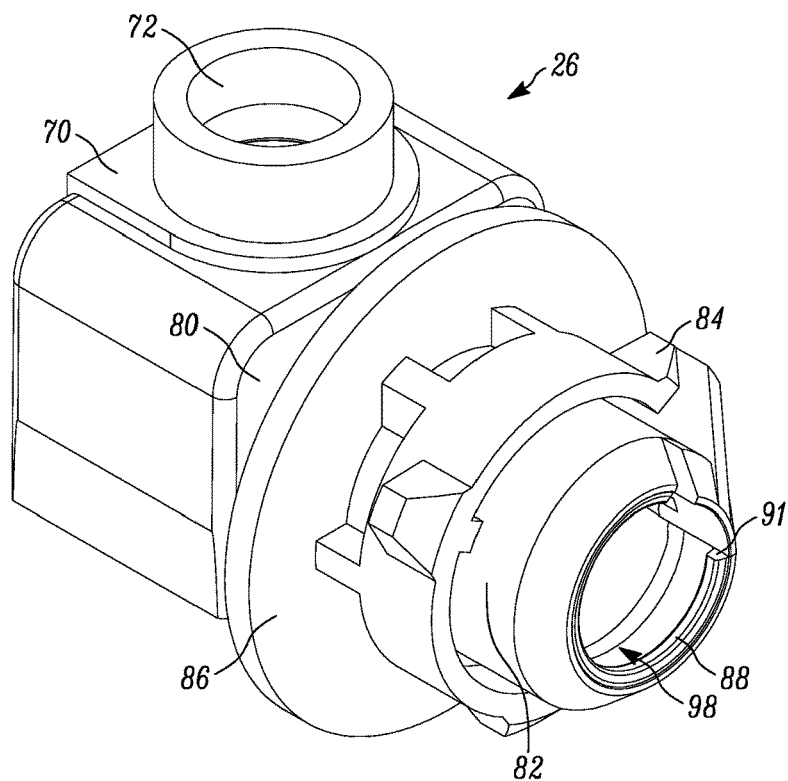
FIG. 2A is a front perspective view of the adjuster housing shown in FIG. 1A.
Figure 2B:
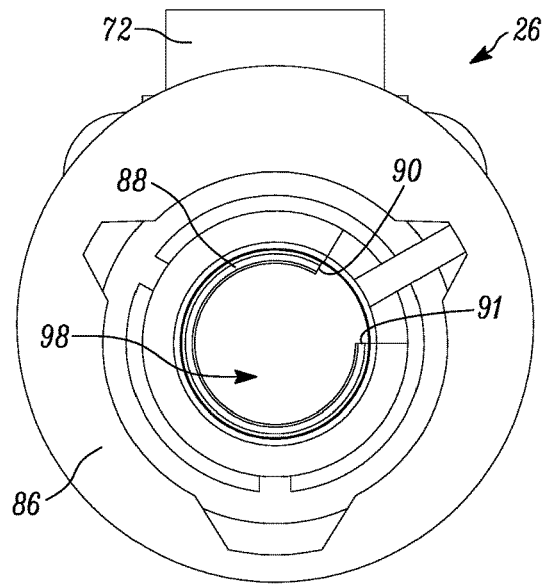
FIG. 2B is a front view of the adjuster housing shown in FIG. 2A having two lip stops.
Figure 2C:
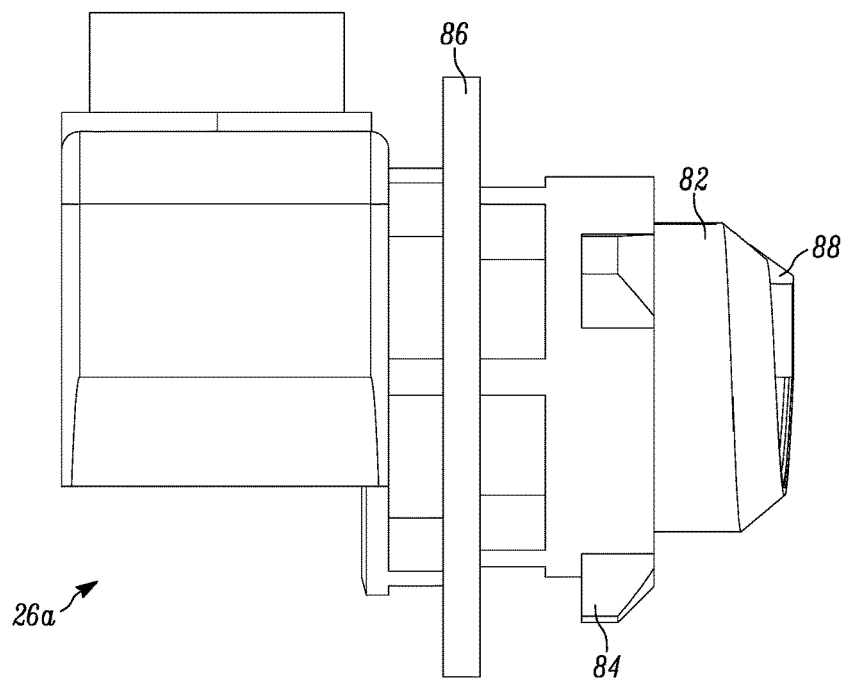
FIG. 2C is a side view of the adjuster housing shown in FIG. 2A.

The housing 26 serves to support input shaft 22 so that the bevel gear properly engages gear 30. The housing 26 can be manufactured from injection molded plastic although other manufacturing techniques and/or materials could be used. Referring to FIGS. 2A-2C, the housing includes a top surface 70 having an annular header 72 extending therefrom. A barrel 82 projects from a front portion 80 of the housing 26, wherein the barrel 82 can include one or more lugs 84 or the like (i.e. screw mount, different type or number of lugs, etc.) that project from an exterior surface. Lugs 84 are used to mount the adjuster in the back of a support frame, such as by using a quarter-turn method. A flange 86 surrounds the outer circumference of barrel 82 and serves as a seat for a gasket 32 (FIG. 1A). When utilized, the gasket 32 seals the adjuster mechanism 20 to the back of a support frame, and an O-ring 34 (FIG. 5A) seals the internal part of adjuster mechanism 20. Thus, in at least some embodiments, a vapor barrier is created to prevent moisture from passing through the adjuster mechanism 20. The barrel 82 can include a radial housing lip 88 that projects inwardly and is shaped to fit one revolution of spiral threads 108 situated along a threaded portion 112 of ball stud 24 (see FIG. 3A). The housing lip 88 has a pair of offset breaks therein so to form an outbound lip stop 90 and an inbound lip stop 91 (see FIG. 2B), the function of which is described below.

Figure 3A:
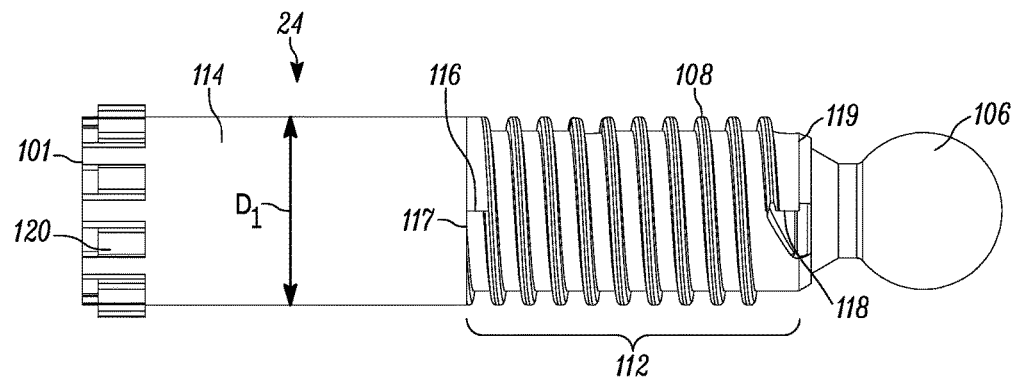
FIG. 3A is a side view of the ball stud shown in FIG. 1A.
Figure 3B:
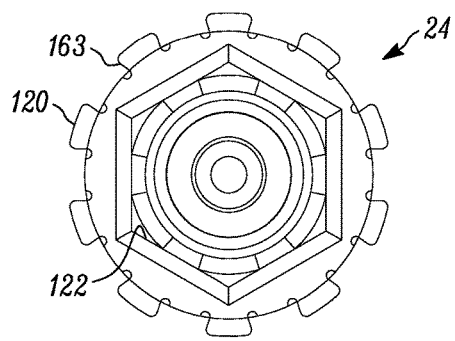
FIG. 3B is a rear view of the ball stud shown in FIG. 3A.
Figure 4A:
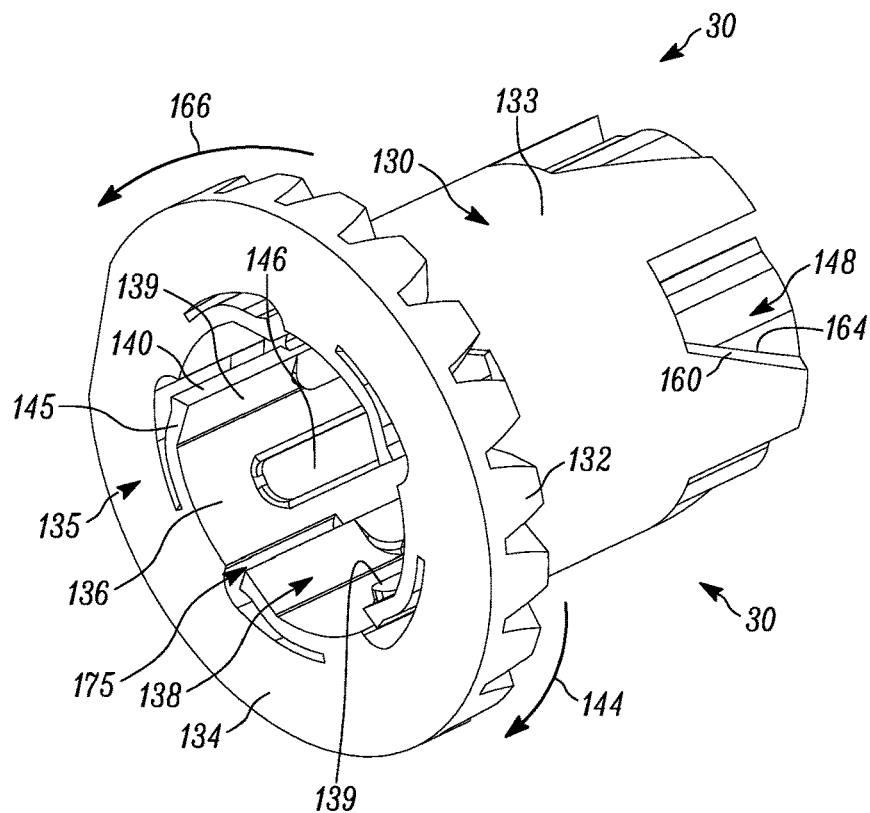
FIG. 4A is a front perspective view of the gear shown in FIG. 1A.
Figure 4B:
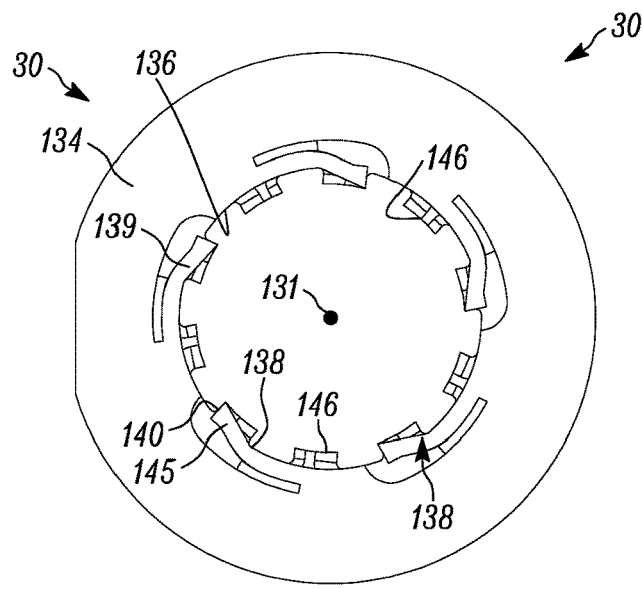
FIG. 4B is a front view of the gear shown in FIG. 4A.
Figure 5A:
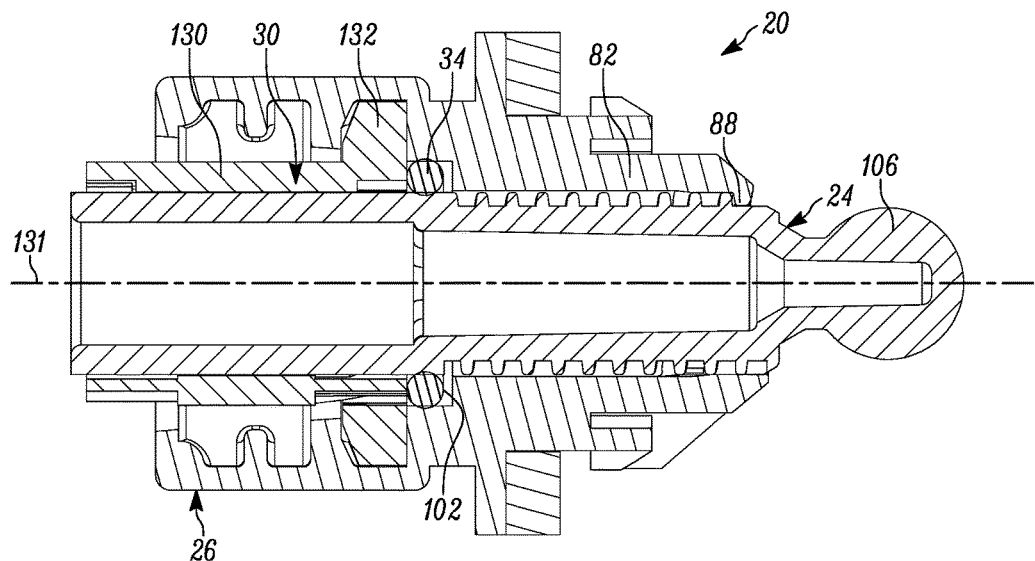
FIG. 5A is a side sectional view of the adjuster shown in FIG. 1A, taken generally along the line 5A-5A in FIG. 1B.
Figure 5B:
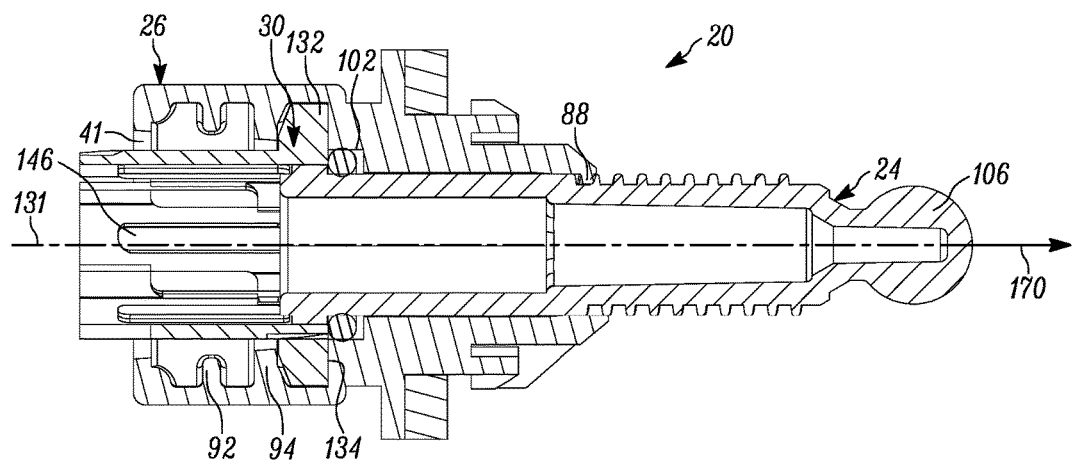
FIG. 5B is a side sectional view of the adjuster shown in FIG. 1D, taken generally along the line 5B-5B in FIG. 1D.
Figure 5C:
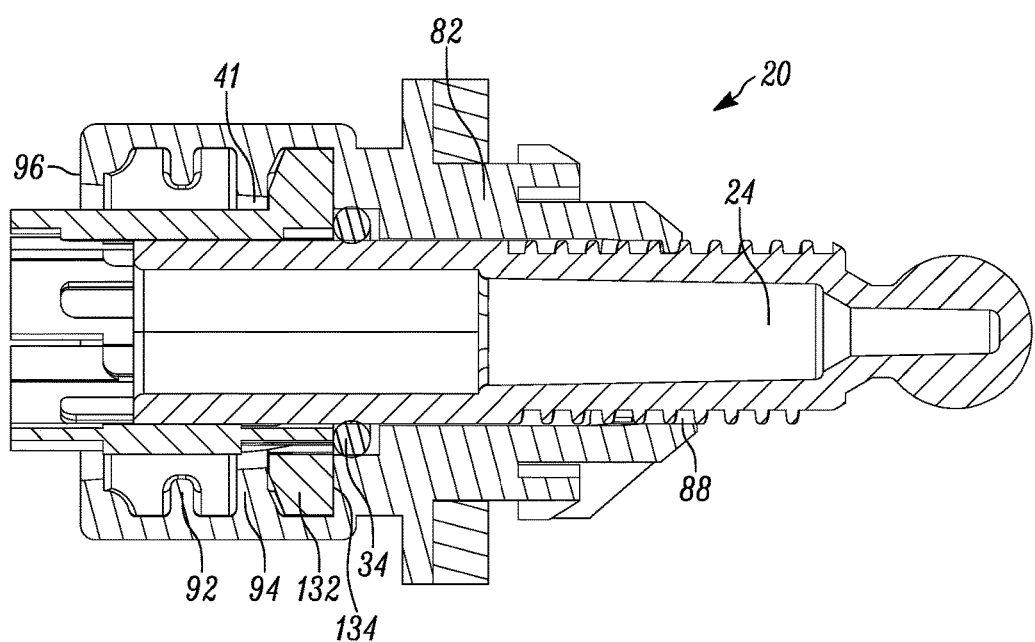
FIG. 5C is a side sectional view of the adjuster shown in FIG. 1C, taken generally along the line 5C-5C in FIG. 1C.

Referring to FIGS. 5A-5C, in at least some embodiments, the inner surface 41 of housing 26 has a pair of annular ribs 92, 94. Rib 92 is rather shallow, and can be included to provide structural support to housing 26. Rib 94 fits against a cylindrical gear body 130 (see FIG. 4A) and a plurality of gear teeth 132 of gear 30 in order to keep the gear 30 from sliding in its longitudinal direction. Communication exists between the ribs 92, 94 of housing 26 and a barrel cavity 98 (see FIG. 2A-2B, 5B) to allow ball stud 24 to extend through the housing 26 and the gear 30. Additional ribs or other structure can be included to provide structural support for the housing 26 or to ensure proper journaling of the gears therein. The gear body further includes a gear body outer surface 133. Referring to FIGS. 3A-3B and 5A, in at least some embodiments, the ball stud 24 is an at least partially hollow cylindrical member that is constructed from a tough plastic composite such glass-filled nylon, although in other embodiments, the ball stud 24 can be made from other types of plastic, plastic composites, or from metal, and can be wholly or partially solid as well. At the front end of ball stud 24 is a ball end 106 that could be of various shapes depending on the type of socket into which it is placed to be secured to the reflector (see FIG. 13 of U.S. Pat. No. 6,773,153). The ball end 106 extends from a threaded portion 112, which further extends from a ball stud main body portion 114. As seen most clearly in FIG. 3A, there is an outbound ball stud stop 116 at a rear end 117 of the threaded portion 112, and an inbound ball stud stop 118 at the front end 119 of the threaded portion 112. The ball stud stops 116 and 118 interact with the lip stops 90 and 91 to prevent the ball stud 24 from being over-extended or over-retracted. The length of the threaded portion 112 and location of the ball stud stops 116 and 118 are determined by the desired maximum and minimum extension of the ball stud 24. Near the rear section of ball stud 24 at the ball stud end 101 is a series of ball stud teeth 120 extending radially from the ball stud main body portion 114. The ball stud teeth 120 will engage an inner surface of the gear 30 as described below. As mentioned, the ball stud 24 is at least partially hollow, and preferably up towards the ball end 106. This has the advantage of reducing cost and weight as compared to solid ball studs. The use of a relatively large diameter hollow body resists deflection better than other solid plastic ball studs of smaller dimension. At the rear portion of ball stud 24 nearest the ball stud end 101, an inner engagement surface 122 can be provided that can include a hexagonal, TORX®, or other shape to accommodate an assembly tool (FIG. 3B).

Figure 2D:
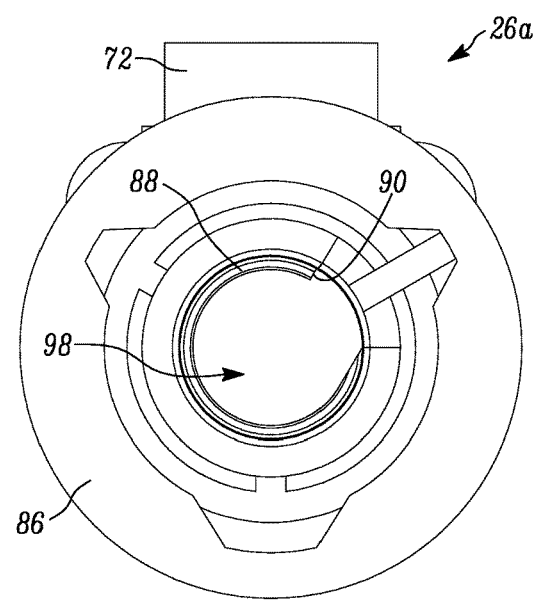
FIG. 2D is a front view of alternative exemplary embodiment of the adjuster housing shown in FIG. 1A, having a single lip stop.
Figure 3C:
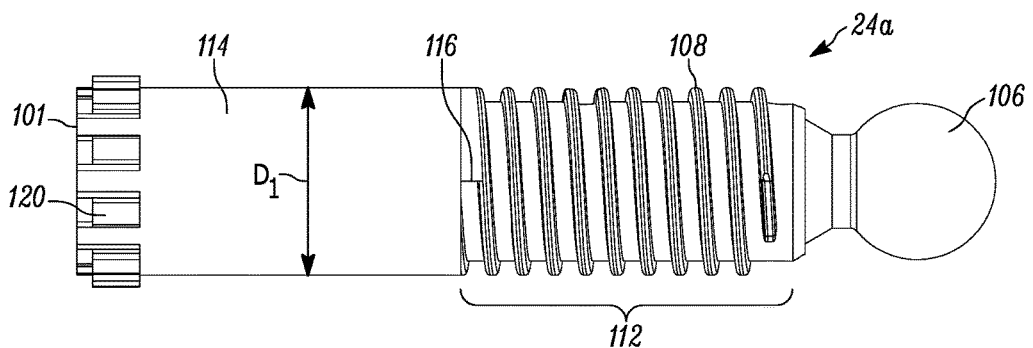
FIG. 3C is a side view of an another exemplary embodiment of the ball stud shown in FIG. 1A.

FIG. 2D is a front perspective view of another exemplary embodiment of the adjuster housing shown in FIG. 1A, identified as adjuster housing 26a, which is similar to adjuster housing 26, with the exception that it omits the inbound lip stop 91. FIG. 3C is a side view of an alternative embodiment of the ball stud for use with the housing 26a of FIG. 2D, identified as ball stud 24a, which is similar to ball stud 24, with the exception that it omits the inbound ball stop 118. Where the inclusion of the outbound lip stop 90 and inbound lip stop 91, along with both ball stud stops 116 and 118, provides for bidirectional clutching, the inclusion of only outbound lip stop 90 and outbound ball stud stop 116 (as shown in FIGS. 2D and 3C) serves to provide unidirectional clutching. In such a unidirectional clutching embodiment, to prevent over-retraction, a mechanical stop can be provided external to the housing 26 (when either fully retracted or extended) in place of the inbound lip stop 91 and inbound ball stud stop 118, such as when the ball stud 24 is secured to a socket in the reflector, as discussed above. The ball socket could also be designed to collide with the housing 26 or another headlamp part at the end of travel to provide a mechanical stop and allow gear 30 to clutch without damage being caused between the engaged portions.

Figure 3D:
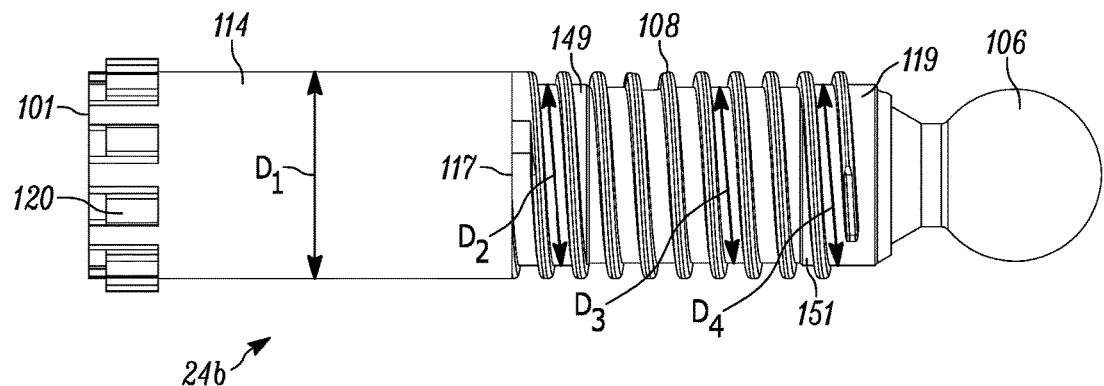
FIG. 3D is a side view of yet another exemplary embodiment of the ball stud 24, having an outbound shoulder and inbound shoulder along a threaded portion.
Figure 3E:
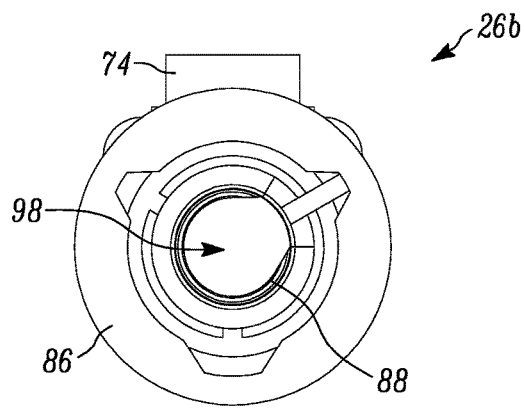
FIG. 3E is a front view of another exemplary embodiment of the adjuster housing 26.

Referring to FIGS. 3D and 3E, further exemplary embodiments of the ball stud and adjuster housing are provided, identified as ball stud 24b and adjuster housing 26b, wherein the lip stops 90, 91 and ball stud stops 116, 118 are omitted. Instead, thread interference between the ball stud 24b and housing 26b is provided by an outbound shoulder 149 and an inbound shoulder 151, which extend longitudinally about the ends of the threaded portion 112. More particularly, the outbound shoulder 149 extends from the rear end 117 of the threaded portion 112 and includes a diameter D2 that is greater than the core diameter D3 (the diameter not including the threads themselves) of the threaded portion, thereby providing a thread interference fit. As a result, upon outbound movement of the ball stud 24b, eventually the increased diameter D2 abuts the housing lip 88 (which is sized to accommodate diameter D3), causing increased rotational resistance, thereby activating the clutching mechanism (as discussed above) to prevent further extension of the ball stud 24 from the housing 26. Similarly, the inbound shoulder 151 extends from the front end 119 of the threaded portion 112 and includes a diameter D4 that is greater than the core diameter D3 of the threaded portion, thereby providing thread interference. As a result, upon inbound movement of the ball stud 24b, eventually the increased diameter D4 abuts the housing lip 88, causing increased rotational resistance and thereby activating the clutching mechanism (as discussed above) to prevent further retraction of the ball stud 24b from the housing 26b. As the outbound shoulder 149 and inbound shoulder 151 provide the necessary thread interference, the aforementioned stops are not necessary, although various combinations of stops and shoulders can be used to provide the necessary interference/abutment to increase the extension or retraction force sufficiently enough to initiate action of the clutching mechanism. It is noted that although FIG. 3D illustrates a flat portion at the very end of the threads on the rear end 117, which is in at least some embodiments, is similar in shape and size to the outbound ball stud stop 116 seen in FIG. 3A, this portion can be an artifact of the production process, and although it could be utilized as a stop in some embodiments, in the present embodiment, the outbound shoulder 149 abuts the housing lip 88 before any contact with this portion would occur.

Gear 30 can be constructed from injection-molded plastic or other material. When engaged, gear 30 can rotate ball stud 24, and when disengaged, gear 30 acts as a clutching mechanism. Generally, gear 30 engages the teeth 120 of ball stud 24 during adjustment causing rotation of the ball stud, and slips in relation to ball stud 24 if over-adjusted in either direction (i.e., fully retracted inbound or fully extended outbound).

Referring to FIGS. 4A-4J, gear 30 has several external features. At a gear body front end 135 of gear body 130 is a toothed portion with the plurality of gear teeth 132 thereon for engagement with the bevel gear on the input shaft 22. The gear front wall 134 of the toothed portion is preferably flat and substantially perpendicular to a longitudinal center gear body axis 131 so that proper gear alignment be maintained between gear 30 and housing 26. Extending from a gear inner surface 136 and adjacent the gear front wall 134, is a number of flexible outbound clutch tabs 138 that act as small flat springs that flex in the radial direction. The outbound clutch tabs 138 protrude inwardly relative to the gear inner surface 136 and include a recessed outbound bottom wall 152, and an outbound top wall 145 that extends adjacent to the gear front wall 134. The outbound clutch tab 138 can be generally arcuate in shape, or in at least some embodiments, the outbound clutch tab 138 can include a bent portion 139. An outbound stop wall 140 extends longitudinally substantially between the outbound bottom wall 152 and the outbound top wall 145 (see FIG. 4C). Additionally, the outbound clutch tabs 138 extend from the gear body 130 along a recessed outbound side wall 147, which angles relative to the gear body axis as it extends longitudinally about the gear body 130 to form an outbound hinge 150.

The angling of the outbound side wall 147 provides the outbound clutch tabs 138 with a lower level of gear clutching torque, to prevent or substantially prevent damage to the outbound ball stud stop 116 upon over-adjustment, while maintaining enough rigidity to re-engage and rotate the ball stud 24 in a reverse direction. More particularly, when teeth 120 are aligned with the outbound clutch tabs 138, the ball stud 24 is prevented from rotation by outbound ball stud stop 116. When gear 30 rotates in the counter-clockwise direction as indicated by arrow 166, the outbound clutch tabs 138 slip over the teeth 120 to prevent stripping or failure from over-adjustment. However, the teeth 120 engage the outbound stop wall 140 when an attempt is made to move gear 30 in an opposite direction, as indicated by arrow 144. As gear 30 is rotated in the direction of arrow 144, the outbound stop walls 140 of the outbound clutch tabs 138 positively engage the teeth 120 to provide enough force against the teeth 120 to rotate the ball stud 24. When this happens, ball stud 24 can once again be moved in a linear direction so that teeth 120 engage a plurality of gear splines 146 along the gear inner surface 136. Thus, outbound clutch tabs 138 prevent permanent disengagement of ball stud 24 during an outbound adjustment.

Figure 4C:
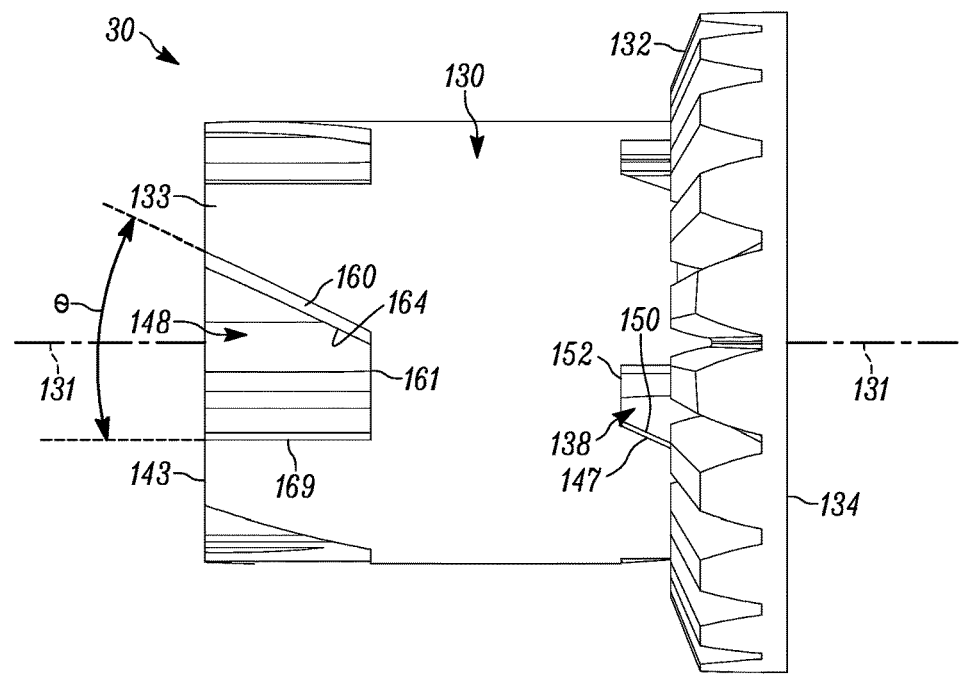
FIG. 4C is a side view of the gear shown in FIG. 4A.
Figure 4D:
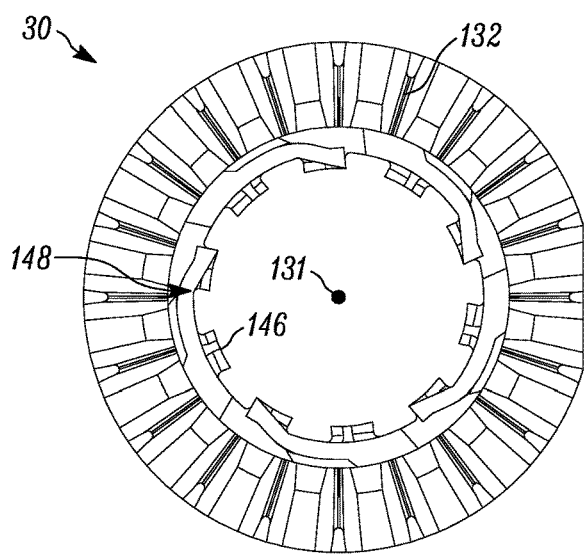
FIG. 4D is a rear view of the gear shown in FIG. 4A.
Figure 4E:
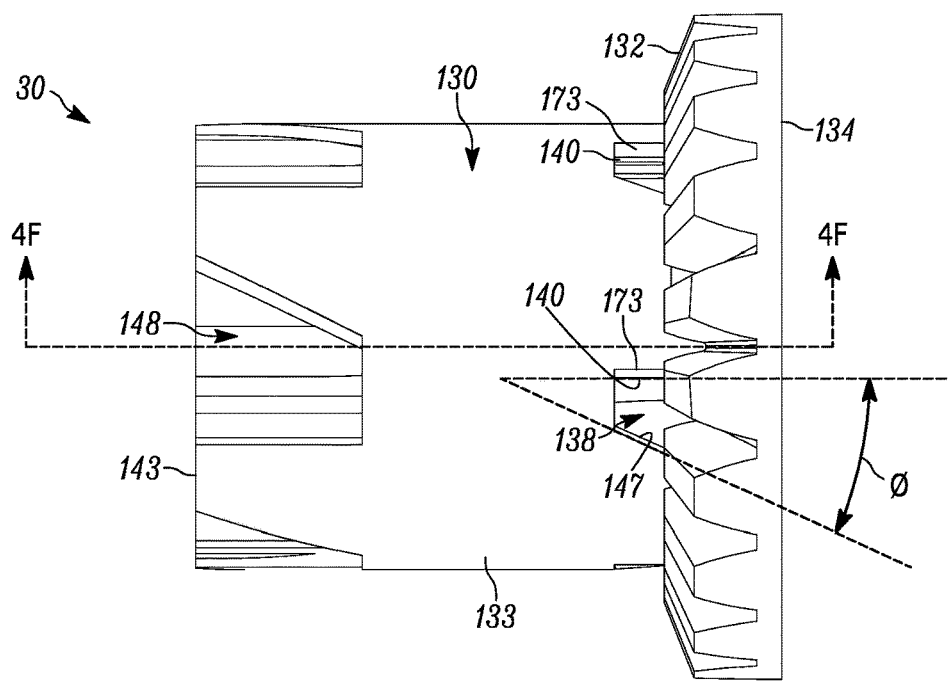
FIG. 4E is another side view of the gear shown in FIG. 4A.
Figure 4F:
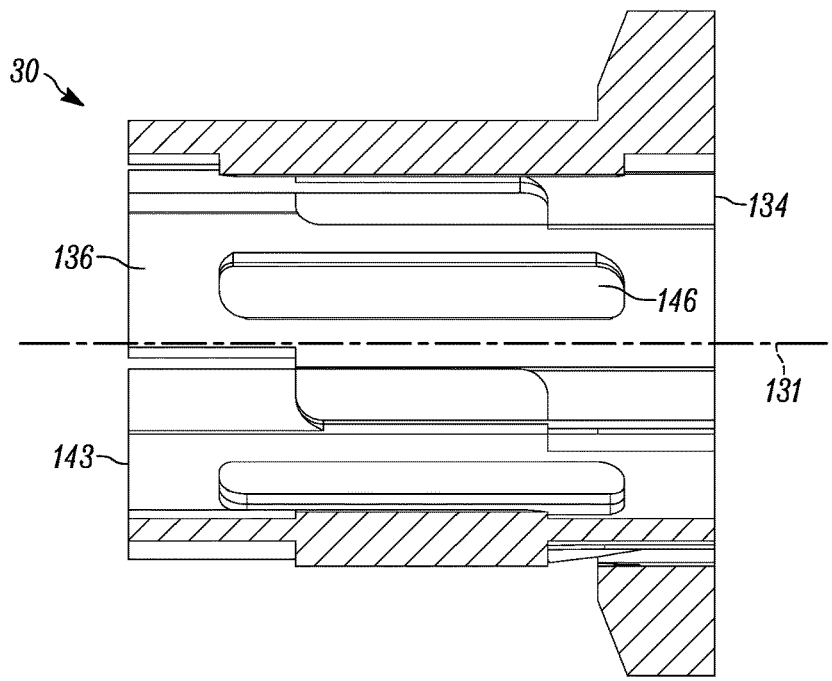
FIG. 4F is a side sectional view of the gear shown in FIG. 4A, taken generally along the line 4F-4F in FIG. 4E.
Figures 4G, 4H:
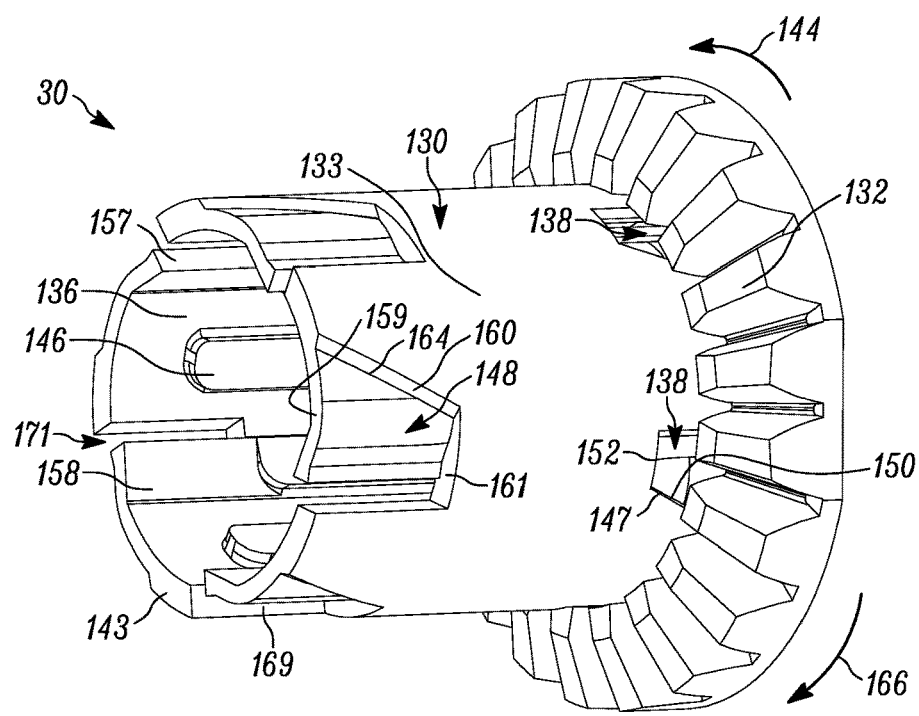
FIG. 4G is a rear perspective view of the gear shown in FIG. 4A.
FIG. 4H is a detailed view of a portion of the adjuster shown in FIG. 1E.
Figure 4I:
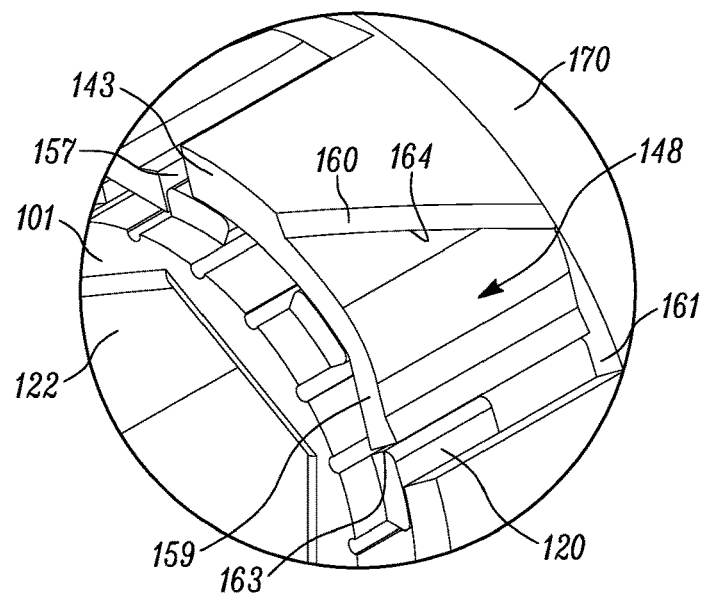
FIG. 4I is a detailed view of a portion of the adjuster shown in FIG. 1A.
Figure 4J:
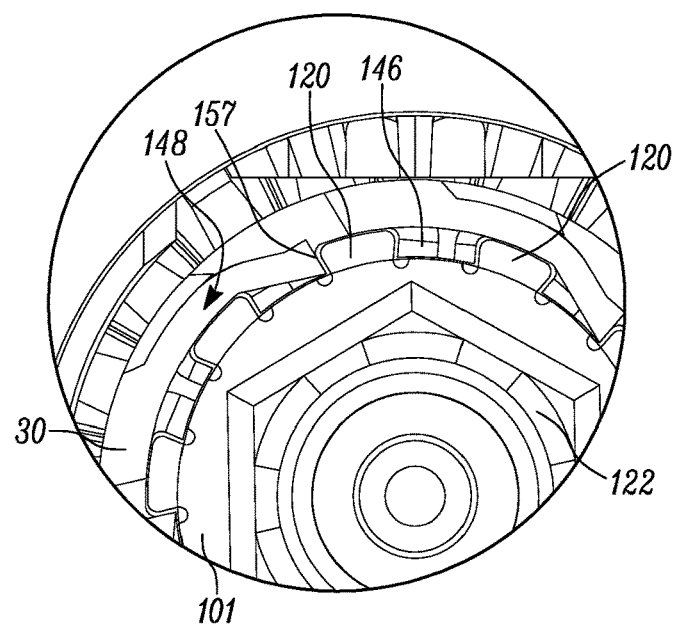
FIG. 4J is a detailed view of a portion of the adjuster shown in FIG. 1E.

Still referring to FIGS. 4A-4J, the plurality of gear splines 146 extend longitudinally along gear inner surface 136 to essentially form an elongated gear ring. When the ball stud 24 is inserted into the gear 30, the gear splines 146 are situated between the teeth 120 of ball stud 24 so as to engage the teeth 120 during rotation of the gear 30. As best seen in FIG. 4G, situated adjacent the gear rear wall 143 are a plurality of flexible inbound clutch tabs 148, which in at least some embodiments, are similar to the outbound clutch tabs 138. More particularly, the inbound clutch tabs 148 project inwardly and act as small flat springs that flex in a radial direction. The inbound clutch tabs 148 protrude inwardly relative to the gear inner surface 136 and include an inbound bottom wall 161, and an inbound top wall 159 that extends adjacent to the gear rear wall 143. The inbound clutch tabs 148 can be generally arcuate in shape, or in at least some embodiments, the inbound clutch tabs 148 can each include a bent portion 158 that is bent to extend inward relative to the gear body 130. An inbound stop wall 157 extends longitudinally and substantially between the inbound bottom wall 161 and the inbound top wall 159 of the inbound clutch tabs 148. Additionally, the inbound clutch tabs 148 extend from the gear body 130 at a recessed inbound side wall 160, which angles as it extends longitudinally about the gear body 130 to form an inbound hinge 164.

The angling of the inbound side wall 160 provides the inbound clutch tabs 148 with a lower level of gear clutching torque so as to prevent or substantially prevent damage to the inbound ball stud stop 118 upon over-adjustment, while maintaining enough rigidity to re-engage and rotate the ball stud 24 in a reverse direction. More particularly, when the teeth 120 are aligned with the inbound clutch tabs 148, the ball stud 24 is prevented from rotation by inbound ball stud stop 118, and when gear 30 rotates in the clockwise direction as indicated by arrow 144, the inbound clutch tabs 148 slip over teeth 120 to prevent stripping or failure of the adjuster mechanism 20 from over-adjustment. However, when an attempt is made to move the gear 30 in an opposite direction, as indicated by the arrow 166, the teeth 120 engage the inbound stop walls 157. More specifically, when gear 30 moves in the direction indicated by arrow 166, inbound stop walls 157 of the inbound clutch tabs 148 positively engage the teeth 120 to provide enough force against the teeth 120 to rotate the ball stud 24. When this happens, ball stud 24 can once again move in a linear direction so that teeth 120 re-engage the plurality of gear splines 146 along the inner surface of gear 30. Thus, inbound clutch tabs 148 prevent permanent disengagement of ball stud 24 during an inbound adjustment.

Inbound gear slot walls 169 are provided generally opposite the inbound stop walls 157 to form inbound slots 171 therebetween (see FIGS. 4C and 4G), which allow clutching of the inbound stop walls 157 with the teeth 120. Similarly, outbound gear slot walls 173 are provided opposite the outbound stop walls 140 to form outbound slots 175 therebetween (see FIGS. 4A and 4E), which allow clutching of the outbound stop walls 157 with the teeth 120. As best shown in FIG. 4C, for an inbound clutch tab 148, the angle θ of the inbound side wall 160 relative to the inbound stop wall 157 can vary, although in at least some embodiments, the inbound stop wall 157 is generally parallel with the center gear body axis 131 and angle θ is about 45 degrees, while in other embodiments, angle θ is greater than or less than about 45 degrees, for example 30 degrees, 60 degrees, etc. As best shown in FIG. 4E for an outbound clutch tab 138, the angle φ of the outbound side wall 147 relative to the outbound stop wall 140 can vary, although in at least some embodiments, the outbound stop wall 140 is generally parallel with the center gear body axis 131 and angle φ is about 45 degrees, while in other embodiments, angle φ is greater than or less than about 45 degrees, for example 30 degrees, 60 degrees, etc.

Operation of the outbound clutch tabs 138 and inbound clutch tabs 148 are significant improvements over the prior art. For example, U.S. Pat. No. 6,773,153 discloses a prior art gear having a pair of slots that form a prior art tang configured to provide clutching during over-adjustment. The prior art tang suffers from limited re-engagement torque due to the pair of slots, secured only at a bottom portion, that allow the tang to be cantilevered, and therefore to bend significantly when low torque (e.g., significantly below 1.0 Newton-Meter of force) is applied during a re-engagement attempt. As such, the prior art tang suffers from an inability to provide the required re-engagement force under numerous conditions. In contrast, utilizing multi-wall securement to the gear body 130 and the side walls 147 and 160, the outbound clutch tabs 138 and inbound clutch tabs 148 prevent the cantilevering effect, and in turn substantially prevent bending during re-engagement of the ball stud 24, while allowing sufficiently low clutching torque. Therefore, in at least some embodiments, the outbound clutch tabs 138 and inbound clutch tabs 148 can provide substantially increased re-engagement torque over the prior art tang (e.g., over 1 Newton-Meter of force), while maintaining the low clutching torque (e.g., less than 0.4 Newton-Meters of force), necessary to prevent damage during adjustment.

In addition to the outbound clutch tabs 138 and inbound clutch tabs 148, in at least some embodiments, and as best shown in FIGS. 3B and 4H, the teeth 120 of the ball stud 24 include a dovetail cross-sectional shape, thereby providing teeth notches 163 on either side of the teeth 120. During re-engagement of either of the outbound clutch tabs 138 and inbound clutch tabs 148, their respective stop walls 140 and 157 can positively engage the teeth notches 163 to provide a greater re-engagement force without slipping over the teeth 120.

Figure 1B:
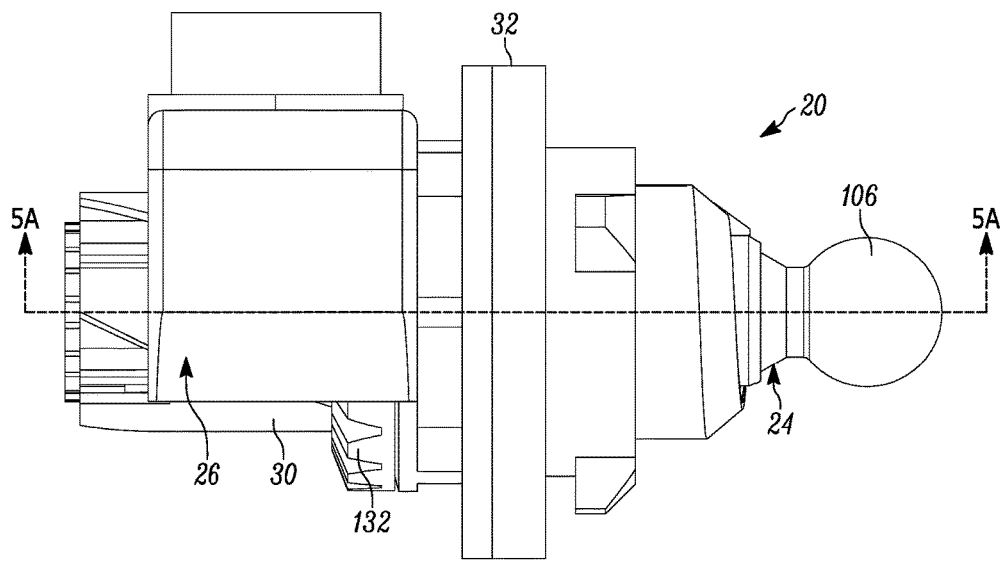
FIG. 1B is a side view of the adjuster shown in FIG. 1A, with a ball stud shown in a retracted position.
Figure 1C:
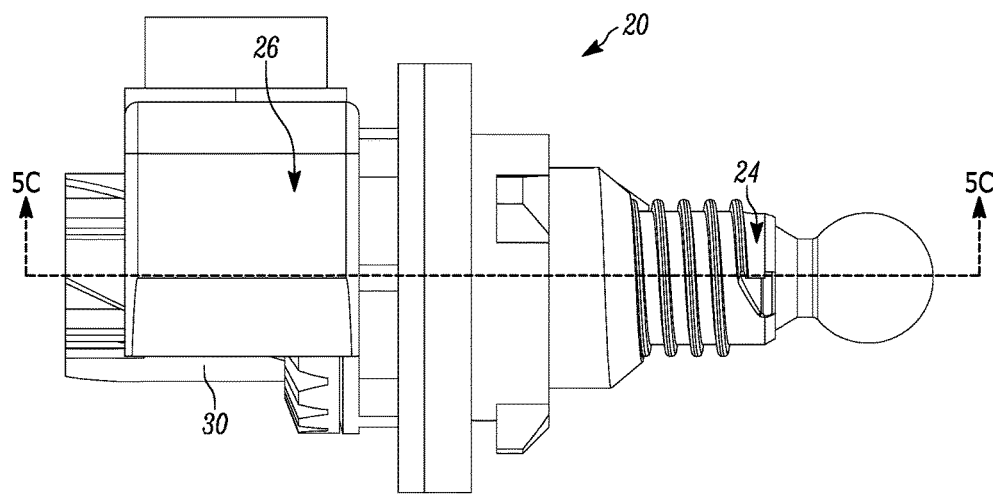
FIG. 1C is a side view of the adjuster shown in FIG. 1A, with a ball stud shown in a central position.
Figure 1D:
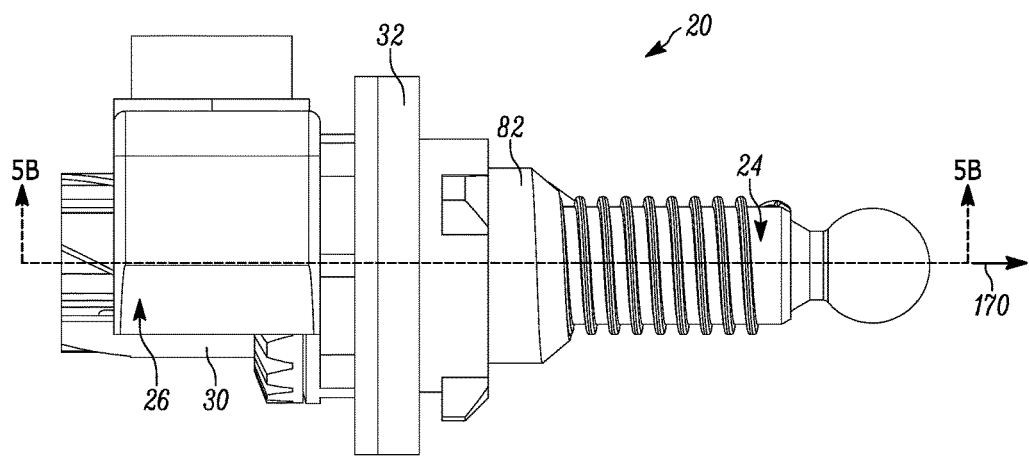
FIG. 1D is a side view of the adjuster shown in FIG. 1A, with a ball stud shown in an extended position.
Figure 1E:
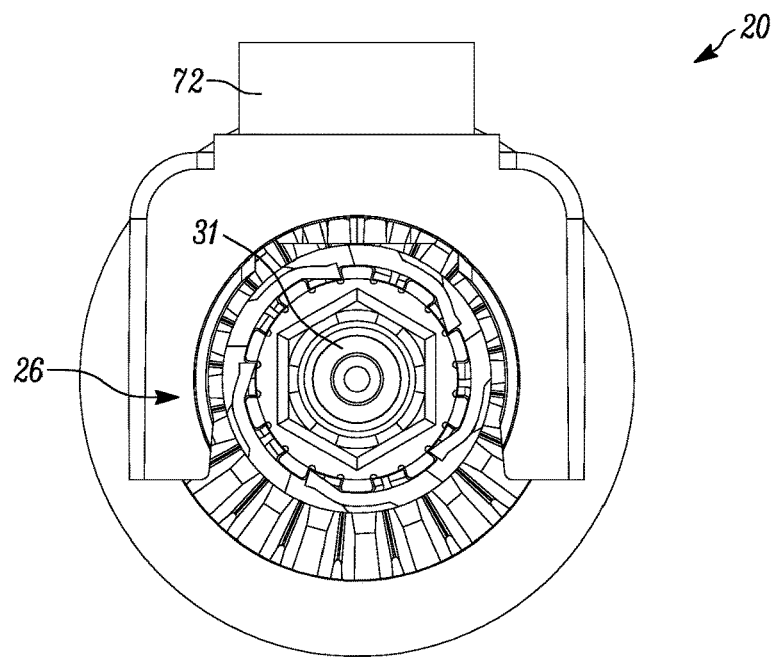
FIG. 1E is an rear view of the adjuster shown in FIG. 1A.
Figure 1F:
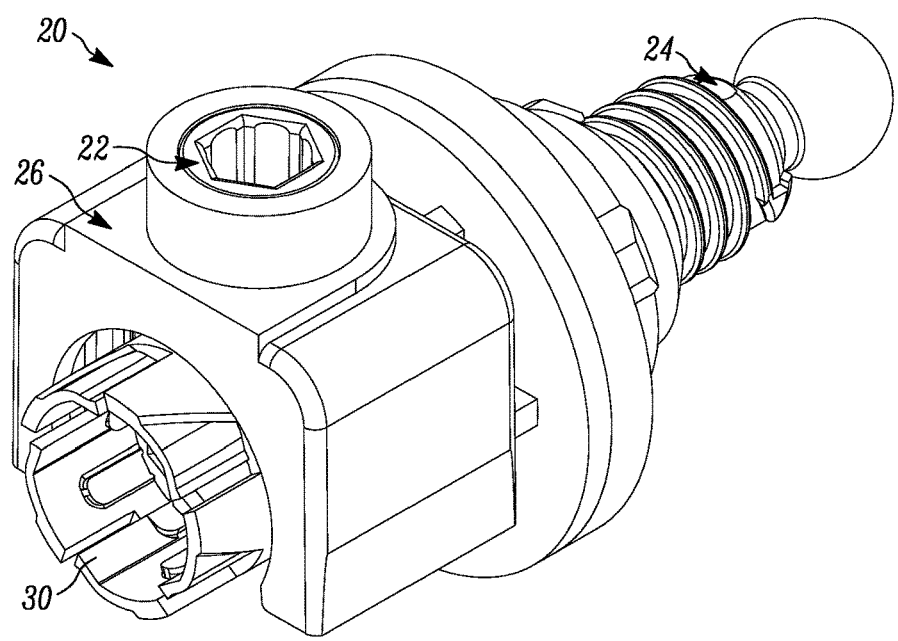
FIG. 1F is another rear perspective view of the clutch force adjuster mechanism with the ball stud extended.

Referring to FIGS. 1B and 5A, the adjuster mechanism 20 is illustrated with ball stud 24 in a fully retracted position (i.e., inbound position). FIGS. 1C and 5C illustrate the ball stud 24 in a central (i.e., middle) position, and FIGS. 1D and 5B illustrate the ball stud 24 in a fully extended position (i.e., outbound position). These positions illustrate the lateral movement of the ball stud 24 relative to the housing 26, which provides resultant movement of an attached lamp assembly. In light of the various available adjustment positions, the assembled adjuster mechanism 20 can be operated as follows. By way of example, a clockwise torque as indicated by arrow 162 (FIG. 1A) is applied to the engagement portion 31 of the input shaft 22. This application of torque causes the input shaft bevel gear to rotate in the clockwise direction, and the gear teeth 132 to which it is engaged to rotate in the direction of arrow 166 as seen in FIGS. 4A and 4G.

Referring now to FIGS. 1D and 5B, the clockwise rotation of the engagement portion 31 causes the ball stud 24 to move in the direction of arrow 170, assuming that the gear splines 146 are in engagement with the teeth 120. If torque is applied until the outbound ball stud stop 116 is in contact with outbound lip stop 90 and the teeth 120 are no longer in engagement with gear splines 146, then ball stud 24 will cease to move in the direction of arrow 170. At this point, teeth 120 slip against outbound clutch tabs 138. Movement of ball stud 24 can then only be obtained by reversing the direction of the applied torque at the engagement portion 31.

Once the direction of applied torque has been reversed so that the gear 30 moves in the direction opposite to arrow 166 (i.e. arrow 144) (see FIG. 4A), teeth 120 engage the outbound stop walls 140 of the outbound clutch tabs 138, causing ball stud 24 to move in the direction opposite of arrow 170. Ball stud 24 can move in the direction opposite to arrow 170 until teeth 120 are no longer in engagement with gear splines 146 and the inbound lip stop 91 engages inbound ball stud stop 118. As before, upon continued application of torque, teeth 120 will slip against inbound clutch tabs 148. If the direction of torque is again reversed to that of direction of arrow 162, teeth 120 will engage the inbound stop walls 157 of the inbound clutch tabs 148, and the ball stud 24 will once again move in the direction of arrow 170.

The bevel gear and gear 30 are held in alignment with each other so not to deflect away or become misaligned under torque. The outer diameter D1 of the ball stud 24 (FIG. 3A) itself is sufficiently sized to withstand radial shear forces exerted upon it by gear 30 that occur under torque. The outer diameter D1 of the ball stud 24 in turn is supported inside and along the length of the barrel 82 like a peg in a hole. Gear 30 is restrained axially via the positioning of gear teeth 132 between the gear front wall 134 and rib 94 (see FIG. 5C).

The ball stud main body portion 114, gear front wall 134, and housing depression 102 (FIG. 5A) form an O-ring cavity for securing O-ring 34 and preventing it from undesired twisting or relocation during adjustment. Hence a radial seal is created and maintained between the main body portion 114 diameter and the inner diameter of the housing depression 102 that prevent contaminants from entering an attached lamp assemblies. The length of travel that the ball stud 24 is capable of in either direction is dependent upon at least the lengths of the gear body 130, the ball stud 24, and the barrel 82. The length of these components can be adjusted to fit the requirements of a particular lamp assembly.

Adjuster mechanism 20 can also be designed with the clutching feature at only one of the ends of the travel of the ball stud 24. If the adjuster mechanism 20 is designed without clutching upon full extension of ball stud 24, then outbound clutch tabs 138 can be omitted from the design of gear 30 and the gear splines 146 can extend through the gear inner surface 136. If the adjuster mechanism 20 is designed without clutching upon full retraction of ball stud 24, then inbound clutch tabs 148 can be omitted from the design of the gear 30 and the gear splines 146 can extend along a gear inner surface 136 (FIG. 4F) of the gear 30. In addition, in at least some embodiments, the stop walls 140 and 157 extend longitudinally parallel to the center gear body axis 131. Further, in at least some embodiments, the inbound and outbound bent portions 139, 158 are angled away from the gear body surface and inward towards the center gear body axis 131.

In at least some embodiments, the clutch force adjuster mechanism 20 further contemplates a lamp assembly for a vehicle including an adjuster having effective length of travel clutching when an undue resistance is present and end of travel clutching regardless of resistance present. Such a lamp assembly would include a lamp housing, a reflector mounted to the lamp housing via a mounting bracket (or mounted directly), a lens covering the housing, and at least one adjuster such as the one disclosed herein having effective length of travel clutching when an undue resistance is present and end of travel clutching regardless of resistance present. If desired, the adjuster can be integrally formed as part of the reflector mounting bracket or as part of the lamp housing.

It is specifically intended that the clutch force adjuster is not to be limited to the embodiments and illustrations contained herein, but include modified forms of those embodiments including portions of the embodiments and combinations of elements of different embodiments as come within the scope of the following claims. Further, any steps described herein with reference to the method of operation (processes) are not to be considered limiting and can include variations, such as additional steps, removed steps, and re-ordered steps.

What is claimed is:

1. An adjuster mechanism comprising:
   an adjuster housing having a barrel extending from a housing front portion, the barrel including an inner barrel cavity and a radial housing lip;
   an adjustment gear situated at least partially inside the adjuster housing, the adjustment gear having a cylindrical gear body, a gear rear wall, a gear front wall, and a plurality of gear teeth;
   a substantially cylindrical ball stud positioned at least partially within the barrel, and that includes a ball stud main body portion having a plurality of stud teeth encircling the ball stud main body portion at a ball stud first end, and a threaded portion longitudinally extending from the main body portion and being threadingly engaged with the radial housing lip to retract and extend the ball stud relative to the radial housing lip during rotation of the ball stud;

a plurality of splines extending longitudinally along an inner surface of the adjustment gear, configured to engage the plurality of stud teeth to provide rotation of the ball stud via rotation of the adjustment gear; and a clutch tab formed in at least one end of the gear body, wherein the clutch tab is recessed inward relative to a gear body outer surface and extends from a recessed side wall to form a side hinge, wherein the clutch tab includes a longitudinal stop wall situated on a bent portion of the clutch tab, and the side hinge is angled relative to the stop wall, and wherein the bent portion is angled inward and away from the gear body outer surface such that the stop wall is engageable with the stud teeth when rotating the gear body in a first direction or second direction and disengageable from the stud teeth when rotating the gear body in the other of the first direction or second direction.

2. The adjuster mechanism of claim 1, wherein disengagement of the stop wall from the stud teeth occurs during an increase in resistance to rotation of the ball stud experienced by the adjustment gear in the other of the first direction or second direction.

3. The adjuster mechanism of claim 2, wherein the clutch tab is formed adjacent to the gear rear wall.

4. The adjuster mechanism of claim 2, wherein the clutch tab is formed adjacent to the gear front wall.

5. The adjuster mechanism of claim 2, wherein two or more clutch tabs are provided and at least one is formed adjacent to the gear front wall and at least one is formed adjacent to the gear rear wall.

6. The adjuster mechanism of claim 1, wherein the recessed side wall and side hinge of the two or more clutch tabs extend at an angle of about 30 degrees to about 60 degrees relative to the stop wall, and the stop wall is substantially parallel with a center gear body axis.

7. The adjuster mechanism of claim 5, wherein the recessed side wall and side hinge of the two or more clutch tabs each extend at an angle of about 45 degrees relative to the stop wall, and the stop wall is substantially parallel with a center gear body axis.

8. The adjuster mechanism of claim 2, wherein the increase in resistance to rotation of the ball stud experienced by the adjustment gear is provided by abutment of a shoulder formed on the threaded portion of the ball stud with the radial housing lip.

9. The adjuster mechanism of claim 2, wherein the increase in resistance to rotation of the ball stud experienced by the adjustment gear is provided by abutment of a ball stud stop formed on the threaded portion of the ball stud with a lip stop formed on the radial housing lip.

10. An adjuster mechanism comprising:

an adjuster housing having a barrel extending from a housing front portion, the barrel including an inner barrel cavity and a radial housing lip;

an adjustment gear situated at least partially inside the adjuster housing, the adjustment gear having a cylindrical gear body with a gear body outer surface, a gear rear wall, a gear front wall, and a plurality of gear teeth;

a substantially cylindrical ball stud positioned at least partially within the barrel and housing, and which includes a ball stud main body portion having a plurality of stud teeth encircling the ball stud main body portion at a ball stud first end, and a threaded portion longitudinally extending from the main body portion and being threadingly engaged with the radial housing lip to retract and extend the ball stud relative to the radial housing lip during rotation of the ball stud;

a plurality of splines extending longitudinally along an inner surface of the adjustment gear, configured to engage the plurality of stud teeth to cause rotation of the ball stud via rotation of the adjustment gear;

an outbound clutch tab formed about a gear body first end, wherein the outbound clutch tab is recessed inward relative to the gear body outer surface and extends from a recessed outbound bottom wall and a recessed outbound side wall to form an outbound side hinge, wherein the outbound clutch tab further includes a longitudinal outbound stop wall situated on an outbound bent portion of the outbound clutch tab that is angled inward and away from the gear body outer surface, such that the outbound stop wall is engageable with the stud teeth when rotating the gear body in a first direction and disengageable from the stud teeth when rotating the gear body in a second direction opposite the first direction, wherein the outbound side hinge is angled relative to the outbound stop wall; and an inbound clutch tab formed about a gear body second end, wherein the inbound clutch tab is recessed inward relative to the gear body outer surface and extends from a recessed inbound bottom wall and a recessed inbound side wall to form an inbound side hinge, wherein the inbound clutch tab further includes a longitudinal inbound stop wall situated on an inbound bent portion of the inbound clutch tab that is angled inward and away from the gear body outer surface, such that the inbound stop wall is engageable with the stud teeth when rotating the gear body in the second direction and disengageable from the stud teeth when rotating the gear body in the first direction, and wherein the inbound side hinge is angled relative to the inbound stop wall.

11. The adjuster mechanism of claim 10, wherein the housing includes an inbound lip stop formed on a portion of the housing lip, and the ball stud includes an inbound ball stud stop that is abuttable with the inbound lip stop during retraction of the ball stud into the housing via rotation of the gear body to prevent over-retraction of the ball stud.

12. The adjuster mechanism of claim 11, wherein upon abutment of the inbound ball stud stop with the inbound lip stop during rotation of the gear body, further rotation of the gear body provides disengagement of the inbound stop wall with the stud teeth.

13. The adjuster mechanism of claim 10, wherein the housing includes an outbound lip stop formed on a portion of the housing lip, and the ball stud includes an outbound ball stud stop that is abuttable with the outbound lip stop during extension of the ball stud from the housing via rotation of the gear body to prevent over-extension of the ball stud.

14. The adjuster mechanism of claim 13, wherein upon abutment of the outbound ball stud stop with the outbound lip stop during rotation of the gear body, further rotation of the gear body provides disengagement of the outbound stop wall with the stud teeth.

15. The adjuster mechanism of claim 10, wherein the housing includes an inbound lip stop formed on a portion of the housing lip, and the ball stud includes an inbound ball stud stop that is abuttable with the inbound lip stop during retraction of the ball stud into the housing via rotation of the gear body, to prevent over-retraction of the ball stud, and wherein upon abutment of the inbound ball stud stop with the inbound lip stop during rotation of the gear body, further rotation of the gear body results in disengagement of the inbound stop wall with the stud teeth; and wherein the housing includes an outbound lip stop formed on a portion of the housing lip, and the ball stud includes an outbound ball stud stop that is abuttable with the outbound lip stop during extension of the ball stud from the housing via rotation of the gear body, to prevent over-extension of the ball stud, and wherein upon abutment of the outbound ball stud stop with the outbound lip stop during rotation of the gear body, further rotation of the gear body results in disengagement of the outbound stop wall with the stud teeth.

16. The adjuster mechanism of claim 10, wherein the ball stud includes an inbound shoulder that extends longitudinally about a threaded portion front end, and that is abuttable with the housing lip during retraction of the ball stud into the housing via rotation of the gear body, to prevent over-retraction of the ball stud and wherein upon abutment of the inbound shoulder with the housing lip, continued rotation of the gear body results in disengagement of the inbound stop wall with the stud teeth.

17. The adjuster mechanism of claim 16, wherein the ball stud includes an outbound shoulder that extends longitudinally about a threaded portion rear end, and that is abuttable with the housing lip during extension of the ball stud from the housing via rotation of the gear body, to prevent over-extension of the ball stud and wherein upon abutment of the outbound shoulder with the housing lip, continued rotation of the gear body results in disengagement of the outbound stop wall with the stud teeth.

18. The adjuster mechanism of claim 10, wherein the ball stud includes an inbound shoulder that extends longitudinally about a threaded portion front end, and that is abuttable with the housing lip during retraction of the ball stud into the housing via rotation of the gear body, to prevent over-retraction of the ball stud and wherein upon abutment of the inbound shoulder with the housing lip, continued rotation of the gear body results in disengagement of the inbound stop wall with the stud teeth; and wherein the ball stud includes an outbound shoulder that extends longitudinally about a threaded portion rear end, and that is abuttable with the housing lip during extension of the ball stud from the housing via rotation of the gear body to prevent over-extension of the ball stud, and wherein upon abutment of the outbound shoulder with the housing lip, continued rotation of the gear body results in disengagement of the outbound stop wall with the stud teeth.

19. An adjustment gear comprising:

a gear body with a gear body outer surface, an inner surface, a gear rear wall, a gear front wall, and a plurality of gear teeth;

a plurality of protrusions extending longitudinally along the inner surface engageable with a ball stud;

an outbound clutch tab formed about a gear body first end, wherein the outbound clutch tab is recessed inward relative to the gear body outer surface and extends at least in part from a recessed outbound side wall to form an outbound side hinge, the outbound clutch tab further includes a longitudinal outbound stop wall situated on an outbound bent portion that is angled inward and away from the gear body outer surface, wherein the outbound stop wall is engageable with one or more portions of the ball stud during a first directional rotation of the gear body and is disengageable with the one or more portions of the ball stud during a second and opposite directional rotation of the gear body, and wherein the outbound hinge is angled relative to the outbound stop wall; and an inbound clutch tab formed about a gear body second end, wherein the inbound clutch tab is recessed inward relative to the gear body outer surface and extends at least in part from a recessed inbound side wall to form an inbound side hinge, wherein the inbound clutch tab further includes a longitudinal inbound stop wall situated on an inbound bent portion that is angled inward and away from the gear body outer surface, wherein the inbound stop wall is disengageable with the one or more portions of the ball stud during the first directional rotation of the gear body and is engageable with the one or more portions of the ball stud during the second directional rotation of the gear body, and wherein the inbound hinge is angled relative to the inbound stop wall.

20. The adjustment gear of claim 19, wherein the inbound clutch tab is formed at least in part by a portion of a gear rear wall and the outbound clutch tab is formed at least in part by a portion of a gear front wall, and wherein the inbound side hinge extends at an angle of about 30 degrees to about 60 degrees relative to the inbound stop wall, and wherein the outbound side hinge extends at an angle of about 30 degrees to about 60 degrees relative to the outbound stop wall, and wherein the inbound stop wall and outbound stop wall are substantially parallel with a center gear body axis.

* * * * *